ён

United States Patent [19]

Nuss

[11] Patent Number: 5,528,389
[45] Date of Patent: Jun. 18, 1996

[54] OPTICAL HOLOGRAPHIC SYSTEM FOR PARALLEL TO SERIAL AND SERIAL TO PARALLEL CONVERSION OF OPTICAL DATA

[75] Inventor: Martin C. Nuss, Fair Haven, N.J.

[73] Assignee: AT&T Corp., Murray Hill, N.J.

[21] Appl. No.: 339,055

[22] Filed: Nov. 14, 1994

Related U.S. Application Data

[63] Continuation-in-part of Ser. No. 177,018, Jan. 4, 1994, abandoned.

[51] Int. Cl.$^6$ .................................................. G02B 27/46
[52] U.S. Cl. ............................ 359/4; 359/29; 359/559; 382/280
[58] Field of Search ........................ 359/3, 4, 7, 29, 359/559, 560, 561, 563, 564; 382/280

[56] References Cited

U.S. PATENT DOCUMENTS

| | | |
|---|---|---|
| 3,608,992 | 9/1971 | Phelps. |
| 3,612,641 | 10/1971 | Eaglesfield. |
| 3,899,240 | 8/1975 | Gabor. |
| 4,082,429 | 4/1978 | Ward, III et al. ................ 359/563 |
| 4,339,176 | 7/1982 | Lee. |
| 4,655,547 | 4/1987 | Heritage et al. ................ 359/563 |
| 4,971,409 | 11/1990 | Yeh et al.. |
| 5,018,801 | 5/1991 | Cronin-Golomb et al. ........ 359/563 |
| 5,080,464 | 1/1992 | Toyoda. |
| 5,150,228 | 9/1992 | Liu et al.. |
| 5,150,229 | 9/1992 | Takesue et al.. |
| 5,187,598 | 2/1993 | Posluszny et al. ................ 359/563 |
| 5,216,529 | 6/1993 | Paek et al.. |
| 5,274,716 | 12/1993 | Mitsuoka et al.. |
| 5,289,299 | 2/1994 | Paek et al.. |

OTHER PUBLICATIONS

A. M. Weiner et al., "Femtosecond Spectral Holography", IEEE Journal of Quantum Electronics, vol. 28, No. 10, Oct. 1992, pp. 2251–2261.

J. Jahns et al., "Dammann Gratings for Laser Beam Shaping", Opt. Eng. vol. 28, 1989, pp. 1267–1275.

M. C. Nuss et al., "Time–to–Space Mapping of Femtosecond Pulses", Opt. Lett, vol. 19, 1994, pp. 664–666.

A. Partovi et al., "Volume Holographic Storage in Hydrogen Treated Germano–Silicate Glass", Appl. Phys. Lett. vol. 64, No. 7, 1994, pp. 821–823.

A. Partovi et al., "Cr–Doped GaAs/AlGaAs Semi–Insulating Multiple Quantum Well Photorefractive Devices", Appl. Phys. Lett. vol. 62, No. 5, 1993, pp. 464–466.

K. Smith et al., "All–Optical Clock Recovery Using a Mode–Locked Laser", Electronics Lett., vol. 28, No. 19, Sep. 1992, pp. 1814–1816.

A. M. Weiner et al., "High–Resolution Femtosecond Pulse Shaping", J. Opt. Soc. AM. B, vol. 5, 1988, pp. 1563–1572.

A. M. Weiner et al., "Programmable Shaping of Femtosecond Optical Pulses by Use of 128–Element Liquid Crystal Phase Modulator", IEEE J. Quant. Electr. vol. 28, No. 4, 1992, pp. 909–920.

T. K. Woodward et al., "GaAs/AlGaAs FET–SEED Receiver/Transmitters", OSA Proc. on Photonics in Swtiching, vol. 16, 1993, pp. 89–93.

*Primary Examiner*—Martin Lerner

[57] ABSTRACT

A serial-to-parallel and parallel-to-serial conversion apparatus and method are disclosed to convert optical pulse data into temporally multiplexed ultra-fast optical pulses, and vice versa, using Fourier holographic transform techniques. In a first embodiment, optical pattern data is converted from a serial temporal-domain optical input signal to an output signal having parallel bits by recording a spectral hologram of the pulse data and reading it out with a continuous-wave (cw) laser. In a second embodiment, signals representing input bits in parallel may be optically multiplexed in the time domain, so that a single optical fiber may carry such signals without the electronic processing necessary in conventional switching multiplexers.

20 Claims, 2 Drawing Sheets

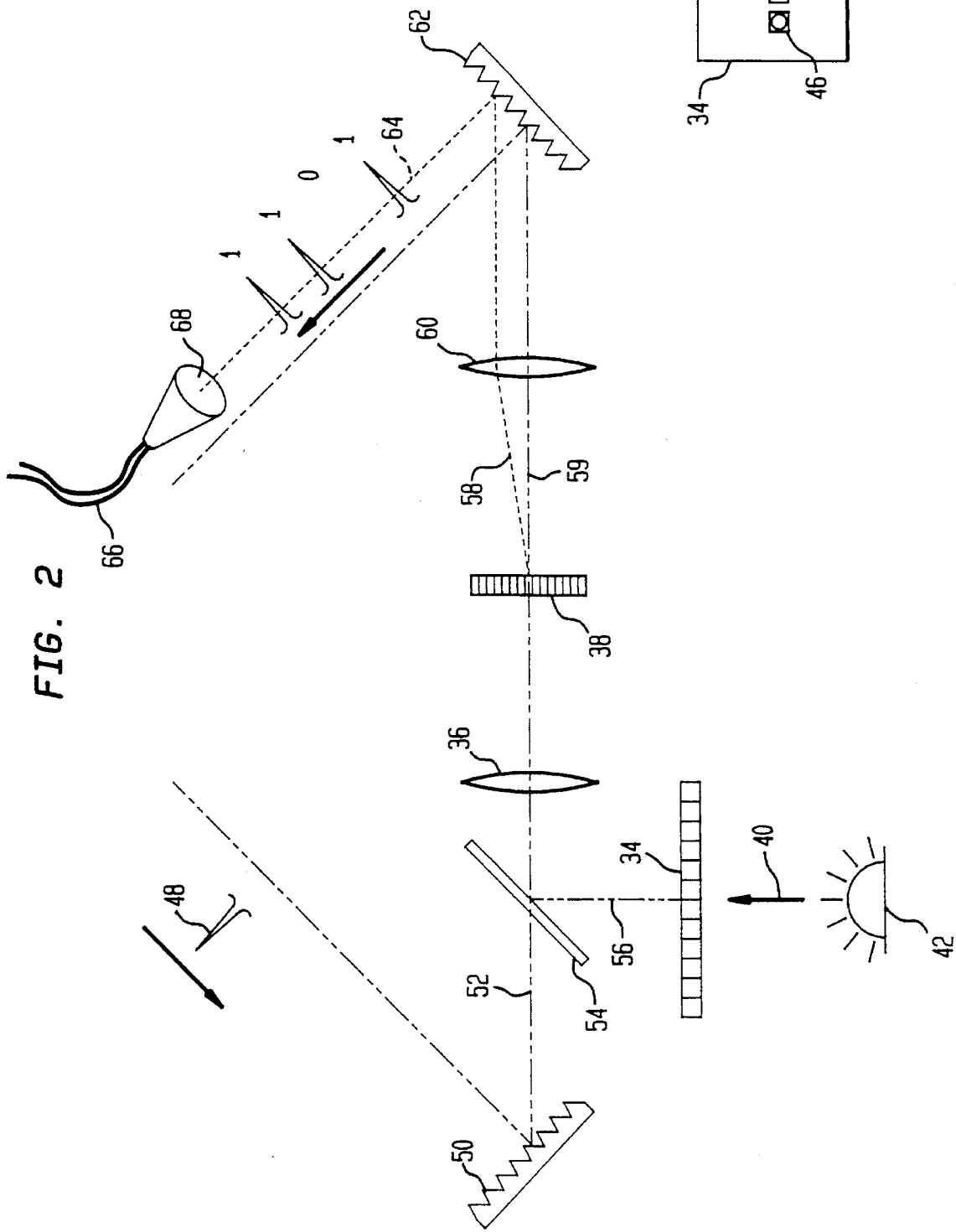

OPTICAL HOLOGRAPHIC SYSTEM FOR PARALLEL TO SERIAL AND SERIAL TO PARALLEL CONVERSION OF OPTICAL DATA

CROSS REFERENCE TO RELATED APPLICATION

This application is a continuation-in-part of application Ser. No. 08/177,018, filed Jan. 4, 1994, now abandoned.

BACKGROUND OF THE INVENTION

1. Field of the Invention

The present invention pertains to optical data conversion. More specifically, the present invention pertains to the use of holographic recording for time/space conversion for facilitating serial to parallel and parallel to serial conversion of optical data.

2. Background of the Related Art

In applying signal processing in the time domain, ultrafast signals, that is, signals having bit rates in the Gigabit to Terabit range, are not easily processible by conventional electronics. In particular, serial-to-parallel and parallel-to-serial conversion becomes generally difficult to perform for such high data bit rates.

SUMMARY OF THE INVENTION

The method and system according to the present invention performs serial-to-parallel and parallel-to-serial conversion of optical pulse data into temporally multiplexed ultra-fast optical pulses, and vice versa, using Fourier transform holographic techniques. By applying time-to-space mappings of such ultrafast signals from the time or temporal domain to the spatial domain, as proposed in M. C. Nuss et al., "Time-to-Space Mapping of Femtosecond Pulses", OPT., LETT, VOL. 19, 1994, pp. 664–666, serial-to-parallel and parallel-to-serial conversions of ultrafast signals may be performed.

In a preferred embodiment, ultra-fast temporal optical pulse data are converted into a space-domain optical output by recording a spectral hologram of the pulse data and reading it out with a continuous-wave (cw) laser. In another preferred embodiment, spatial parallel data signals are optically multiplexed out to a single data channel in the time domain for facilitating transmission through a single optical fiber, without the electronic processing necessary in conventional switching multiplexers.

The method and apparatus according to the invention thus facilitates low cost optical communications coding, decoding, demultiplexing, and multiplexing for ultrafast, Gigabits per second (Gbit/s) to Terabits per second (Tbit/s) data pulses. The data rate conversions achievable by bit or packet serial-to-parallel conversion and remultiplexing further extend the system operable frequency range.

BRIEF DESCRIPTION OF THE DRAWINGS

The features of the disclosed serial-to-parallel and parallel-to-serial conversion apparatus and method will become more readily apparent and may be better understood by referring to the following detailed description of an illustrative embodiment of the present invention, taken in conjunction with the accompanying drawings, where:

FIG. 2 illustrates the optical pulse parallel to serial conversion apparatus and data multiplexing method according to the present invention; and FIG. 3 is a diagram of an input parallel data pattern.

DETAILED DESCRIPTION OF THE PREFERRED EMBODIMENTS

Figure 1:
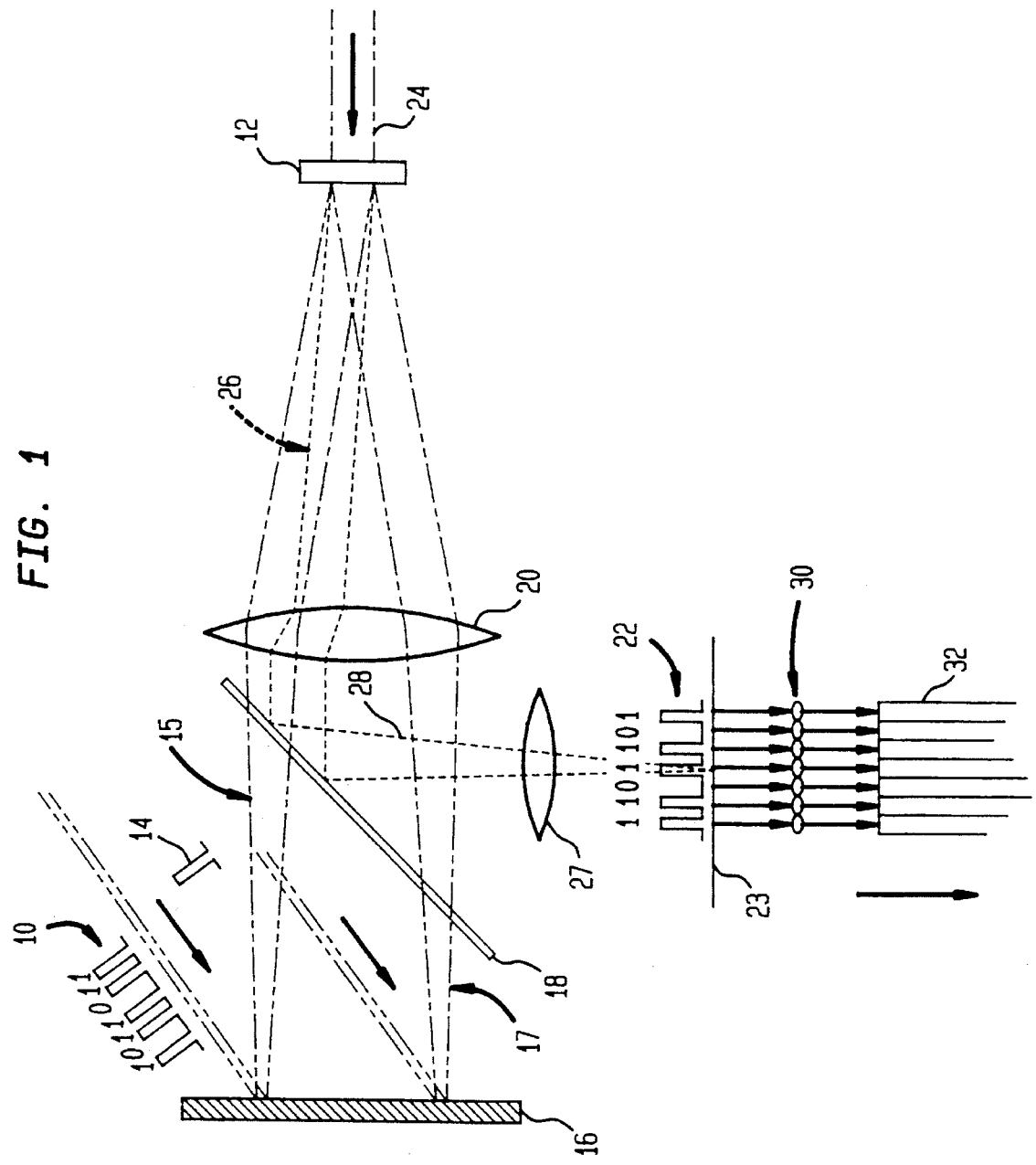
FIG. 1 illustrates the apparatus of the invention for temporally-multiplexed optical pulse serial to parallel conversion.

Referring now in specific detail to the drawings, with like reference numerals identifying similar or identical elements, as shown in FIG. 1, the present disclosure describes all-optical serial-to-parallel and parallel-to-serial conversion of ultrafast optical signals. Ultrafast optical signal conversion is described in commonly owned U.S. application No. 08/177,018, filed Jan. 4, 1994, entitled METHOD AND APPARATUS FOR PROCESSING ULTRAFAST OPTICAL SIGNALS, and U.S. application 08/338,912, application filed Nov. 14, 1994, entitled METHOD AND APPARATUS FOR PROCESSING ULTRAFAST OPTICAL SIGNALS, which are incorporated herein by reference.

SERIAL-TO-PARALLEL CONVERSION

In FIG. 1, for serial-to-parallel conversion, the apparatus receives a multiplexed signal 10 as a packet having N bits. The signal 10 may be temporally multiplexed real time optical pulse data, including interleaved optical signals for N users transmitted in the range of around 10 Gbits/sec to around 10 Tbit/sec. The wavelength spectrum of this packet is holographically recorded by interaction with an optical reference pulse in a multiple quantum well (MQW) material 12 or other holographic materials that can be dynamically written and erased at the packet rate. Both the signal 10 and a reference pulse 14 are diffracted by a dispersive element 16 which may be a diffraction grating, a Dragone router, or any other dispersive element that has an output angle that varies as a function of input wavelength.

Preferably, the optical reference pulse 14 is synchronized with the packet signal 10 by a locally-regenerated data clock having one pulse per packet, which, for example, may be generated by two stages of the clock regeneration scheme described by K. Smith et al., "All-Optical Clock Recovery Using a Mode-Locked Laser", ELECTRONICS LETT., VOL. 28, NO. 19, September 1992, pp. 1814–1816. A first stage provides a uniform pulse train at the bit rate, and the second stage providing a divide-by-N function, where N is the number of bits per packet. Both the duration of the packet signal 10 as well as the time delay between the packet signal 10 and reference pulse 14 may not exceed the time window given by the inverse of the spectral resolution $\Delta v$ of the grating 16.

The packet signal 10 and the reference signal 14 are dispersed as beams 15, 17 by grating 16, pass through a beam splitter 18 and are converted to a wavelength spectrum signal by a Fourier lens 20. Such a Fourier lens is a lens having a distance from an input plane and the lens equal to the distance from the lens to the output plane. The interference pattern between the spectrum of the packet signal and the reference signal is recorded in the holographic medium 12 located at the spectrum plane of the Fourier lens 20.

Preferably, the hologram patterns produced by the optical data packets stored in the MQW material 12 are written and dynamically erased in synchronization with the packet signals 10, so that interference fringes stored in the MQW 12 decay within a time less than the temporal delay between succeeding packets or are erased before the next packet arrives. The erasure may be by flooding the MQW 12 with light from a separate laser source (not shown). In the present embodiment, the patterns are overwritten. The MQW 12 is preferably made of GaAs or InGaAs for operation around 800 nm or 1.5 μm, respectively. The hologram is read by a continuous-wave (cw) laser projecting a beam 24 at around 800 nm or 1.5 μm, respectively. To read the MQW hologram 12, a cw beam of light 24 illuminates the MQW 12 to produce a diffracted beam 26. The diffracted beam 26 is Fourier transformed by the lens 20 and reflected by the beam splitter 18 to introduce an image 22 at the output plane 23 of the lens 27. This image 22 displays the N bits of the multiplexed signal 10 in parallel. The scaling between temporal and spatial patterns is described by:

$$t \to x \cdot \frac{\lambda}{dc \cdot \cos\theta} \quad (1)$$

where $\lambda$ is the wavelength of the laser, d is the pitch of the grating used, c the speed of light, and $\Theta$ is the angle at which the diffracted light beams 15, 17 emerge from the diffraction grating 16. Extensions to different read/write focal lengths and wavelengths may also be performed.

The conversion of the N temporal input bits of the multiplexed signal 10 into N output bits 22 formatted in parallel at the output plane of the disclosed holographic system and method provide for data rate reduction and demultiplexing for ultrafast optical signals.

The optical bits 22 are output to respective channels with each being converted to parallel beams in free space by a microlens array 30 close to the ends of a bundled optical fiber 32.

PARALLEL-TO-SERIAL CONVERSION

FIG. 2 is a diagram of optical pulse parallel to serial conversion and data multiplexing. The conversion apparatus and method facilitates optically remultiplexing of the signals switched to separate fibers in FIG. 1 for serial transmission. Alternatively, the apparatus may also be used to multiplex data from different users or communication channels onto a single high bit-rate communications channel.

In the exemplary embodiment of FIG. 2, electrical signals produced from reduced-rate optical signals in a plurality of separate channels drive respective elements in a field effect transistor self-electro-optic effect device (FET-SEED) electro-absorption light modulator array 34. Electro-optic, acousto-optic, liquid crystal, or mechanical modulator arrays may, alternatively, be used. FET-SEED array elements are capable of modulation rates to 622 Mbits/sec in arrays of up to 128×128 elements, as described in T. K. Woodward et al., "GaAs/AlGaAs FET-SEED Receiver/Transmitters", OSA PROC. ON PHOTONICS IN SWTICHING, VOL. 16, 1993, pp. 89–93. The FET-SEED modulator array 34 is positioned at an input plane of a first Fourier lens 36.

As shown in FIG. 2, a MQW holographic device 38 is located at the spectral plane of that first Fourier lens 36. The modulator array 34 of the plurality of separate channels and the MQW holographic device 38 is illuminated by a beam of light 40 from a continuous-wave (cw) laser 42, such as a laser diode with a wavelength of 830 nm for reading the pattern of the modulator array 34. The modulator array 34 is shown as a transmission modulator. Reflection modulators such as a FET-SEED array may also be used.

As shown in FIG. 3, each pixel in a pattern 44 in the modulator array 34 includes the data from each individual channel to be multiplexed, with the exception of one pixel 46 on the modulator array 34 reserved as a reference pixel and is not modulated. The interference fringe pattern formed between the beam from the reference pixel 46 and the data pixel pattern 44 is written into the MQW holographic device 38, where it is dynamically written and erased at a speed equal to the bit rate of the individual channels of the modulator array 34.

Referring to FIG. 2, an optical pulse 48 is provided by a laser (not shown), which may be a mode-locked laser which may be made of Ti-Sapphire, Cr-LiSAF or Cr-LiCaF. In the exemplary embodiment, the operating wavelength of around 850 nm is used if GaAs/AlGaAs quantum well modulators are used or an Erbium-doped fiber laser operating at 1.5 μm is used, synchronized to the bit rate of the channels of the modulator array 34. In this example, the duty cycle of the laser is less than the inverse of N times the bit rate, where N is the number of parallel channels of the modulator array 34. Semiconductor solid-state or fiber lasers may also be used.

The optical pulse 48 is directed to a first reflective diffraction grating 50 having 600 lines/mm and positioned at the input plane of the first Fourier lens 36 having the MQW holographic device 38 at its spectrum plane. The diffracted optical pulse 52 passes through a beam splitter 54 and co-propagates with the modulator pattern beams 56 illuminated from the modulator array 34 and reflected by the beam splitter 54.

The beam 52 is diffracted at signal 58 from the fringe patterns recorded in the MQW holographic device 38. This diffracted signal 58 is then Fourier-transformed by a second Fourier lens 60 and by a second diffraction grating 62 at the output plane of the second Fourier lens 60. The serially-recombined signals 64 are then entered into a single optical fiber 66 through an imaging lens 68 as multiplexed data. The undiffracted beam 59 is discarded.

While the disclosed ultrafast serial-to-parallel and parallel-to-serial conversion apparatus and method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A method for converting optical bit patterns from a serial format to a parallel format, the method comprising the steps of:

providing an optical storage medium for holographically storing optical signals;

diffracting a first optical signal in a serial format using a grating;

converting the diffracted optical signal to a Fourier transform spectrum signal;

recording a hologram of the first Fourier transform spectrum in a holographic storage medium by interference with the spectrum of a reference pulse;

inputting a continuous-wave beam for reading the Fourier transform spectrum from the optical storage medium; and converting the recorded Fourier transform spectrum to an output bit pattern in a parallel format.

2. The method of claim 1 wherein the step of converting the diffracted optical signal includes the step of Fourier-transforming the diffracted optical signal using a Fourier lens.

3. The method of claim 1 wherein the step of converting the recorded Fourier transform spectrum includes the step of back-Fourier transforming the recorded Fourier transform spectrum using a Fourier lens.

4. The method of claim 1 wherein the step of providing an optical storage medium includes the step of providing a multiple quantum well (MQW) device for storing a plurality of stored optical patterns.

5. The method of claim 1 including the step of providing a continuous wave laser diode for generating the continuous-wave optical signal.

6. The method of claim 1 wherein the step of converting the recorded Fourier transform spectrum includes the steps of:

reflecting the recorded Fourier transform spectrum to generate optical bit patterns in a parallel format using a reflector; and receiving the optical bit patterns in a parallel format using a microlens array.

7. An apparatus for converting optical bit patterns from a serial format to a parallel format, the apparatus comprising:

a grating for diffracting a first input optical signal representing optical bit patterns in a serial format;

a Fourier lens for converting the diffracted first optical signal to a first wavelength spectrum and for converting a stored optical signal to a second optical signal;

an optical storage medium for holographically storing optical signals, and for diffracting a continuous-wave optical beam to output the stored optical signal corresponding to the input first optical signal;

a light source providing the continuous-wave optical beam to the optical storage medium; and means, responsive to the second optical signal, for generating an output signal corresponding to the optical bit patterns converted from a serial format to a parallel format.

8. The apparatus of claim 7 wherein the optical storage medium includes a multiple quantum well (MQW) device for storing a plurality of holograms.

9. A method for converting optical signals from a parallel format to a serial format, the method comprising the steps of:

providing a plurality of optical data signals in a parallel format;

converting the optical data signals to wavelength-domain images;

providing an optical storage medium for holographically storing the wavelength-domain images;

outputting stored images corresponding to the optical data signals;

reconverting the stored optical signals to second optical signals; and diffracting the second optical signals using a grating to generate a plurality of data in a serial format.

10. The method of claim 9 wherein the step of providing a plurality of optical data signals includes the steps of:

inputting a bit pattern to an array;

providing a continuous-wave-optical signal to the array; and generating at least one optical data signal in a parallel format from the array.

11. The method of claim 10 wherein the step of providing a continuous-wave-optical signal includes the step of:

backlighting the array using a light source.

12. The method of claim 9 wherein the step of providing a plurality of optical data signals includes the step of:

reflecting the plurality of optical signals by a beam splitter.

13. The method of claim 9 wherein the step of converting the optical data signals includes the step of:

inputting the optical data signals to a Fourier lens; and generating the wavelength-domain images by the Fourier lens.

14. The method of claim 9 further comprising the steps of:

providing an optical pulse signal; and converting the optical pulse signal to the wavelength-domain images.

15. The method of claim 9 wherein the step of outputting the stored images includes the steps of:

receiving a continuous-wave signal at the optical storage medium; and diffracting the continuous-wave signal to generate the stored images.

16. The method of claim 9 wherein the step of reconverting the stored optical signals includes the steps of:

inputting the stored optical signals to a Fourier lens; and generating the second optical signals by the Fourier lens.

17. An apparatus for converting bit patterns from a parallel format to a serial format, the apparatus comprising:

an array for inputting a first bit pattern;

a light source providing a continuous-wave-optical signal to the array to generate a first output signal corresponding to the first bit pattern;

a beam splitter for reflecting the first optical signal;

a first grating for diffracting an optical pulse signal;

a first Fourier lens for converting the reflected first optical signal to a wavelength spectrum;

an optical storage medium for holographically storing optical signals, and responsive to the wavelength spectrum for outputting stored output signals corresponding to the input first optical signal;

a second Fourier lens for converting the stored optical signal to a second optical signal; and a second grating for diffracting the second optical signal to generate a bit pattern in a serial format.

18. The apparatus of claim 10 wherein the light source backlights the array to generate the corresponding first output signal.

19. The apparatus of claim 10 wherein the optical storage medium, responsive to an optical pulse, outputs the stored output signals.

20. The apparatus of claim 10 wherein the optical storage medium is a multiple quantum well (MQW) device.

* * * * *